United States Patent [19]
Tandy, Jr. et al.

[11] Patent Number: 5,636,857
[45] Date of Patent: Jun. 10, 1997

[54] VEHICLE SOLID AXLE FRONT SUSPENSION SYSTEM

[75] Inventors: Donald F. Tandy, Jr., Novi; Len A. Wolf, Ann Arbor, both of Mich.

[73] Assignee: Ford Motor Company, Dearborn, Mich.

[21] Appl. No.: 398,826

[22] Filed: Mar. 6, 1995

[51] Int. Cl.⁶ .................................................. B60G 3/00
[52] U.S. Cl. ..................... 280/692; 280/718; 280/712; 267/31
[58] Field of Search .......................... 283/710, 712, 283/718, 689, 693, 692, 95.1; 267/227, 25, 31

[56] References Cited

U.S. PATENT DOCUMENTS

| | | | |
|---|---|---|---|
| 1,804,713 | 11/1931 | Stockton | 280/95.1 |
| 1,940,795 | 12/1933 | Gerardi | 180/359 |
| 1,944,441 | 1/1934 | MacPherson | 280/663 |
| 3,064,750 | 4/1962 | Buchwald | 180/360 |
| 3,241,854 | 3/1966 | Hamilton | 280/45.1 |
| 3,556,554 | 1/1971 | Seward | 280/712 |
| 4,271,922 | 6/1981 | Kishline | 180/254 |
| 4,533,157 | 8/1985 | Hoenle et al. | 280/718 |
| 4,678,204 | 7/1987 | Hetherington | 267/31 |
| 4,687,224 | 8/1987 | Selzer | 280/718 |
| 4,804,205 | 2/1989 | Parsons | 280/718 |
| 4,977,733 | 12/1990 | Samajima et al. | 180/236 |
| 5,228,665 | 7/1993 | Berghus et al. | 280/718 X |
| 5,433,410 | 7/1995 | Long | 280/718 |

FOREIGN PATENT DOCUMENTS

| | | | |
|---|---|---|---|
| 125297 | 11/1931 | Germany. | |
| 0662382 | 5/1979 | U.S.S.R. | 280/712 |

OTHER PUBLICATIONS

Photograph of Ford F-800 truck suspension (Photo pp. 8-10) no date.
Photograph of 1990's Ford F-150 Lightning (Photo p. 11) no date.
Photograph of Ford Ranger rear suspension (Photo p. 12) no date.
Photograph of GMC 2500 rear suspension (Photo p. 13) no date.
Photograph of 1994 Ford F-350 4×4 suspension (Photo p. 14) no date.
Photograph of 1990's Dodge front suspension system (Photo pp. 15 & 16) no date.
Photograph of 1990's Ford L-9000 heavy truck steering linkages (Photo p. 1) no date.
Photograph of 1970's International Scout suspension (Photo p. 2) no date.
Photograph of Jeep C-J suspension (Photo p. 3) no date.
Photograph of 1990's Chrysler minivan rear leaf spring suspension system (Photo pp. 4 & 5) no date.
Photograph of 1990's Mercury Villager suspension (Photo p. 6) no date.
Photograph of 1970's Chevrolet 4×4 suspension (Photo p. 7) no date.

*Primary Examiner*—Christopher P. Ellis
*Attorney, Agent, or Firm*—Gregory P. Brown; Roger L. May

[57] ABSTRACT

A novel solid axle front suspension system is disclosed having a staggered shock absorber arrangement which increases and balances shock absorber lever ratios, and provides adequate damping in both vehicle roll and axle pitch conditions. A leaf spring assembly with an elliptical forward bushing improves vehicle suspension noise, vibration and harshness levels. Leaf spring windup is reduced by an axle anti-windup device which is secured at its rearward end to the axle and which includes at its forward end a movable link to the vehicle frame. A bilateral link steering linkage assembly provides improved steering and handling, wherein a tie rod connects the two front steering knuckles together, and a drag link extends from a pitman arm to one of the two steering knuckles at a rearward sweep angle in a substantially horizontal plane. A panard rod extends from the vehicle frame to the solid axle at a rearward sweep angle that is substantially equivalent to the rearward sweep angle of the drag link.

21 Claims, 5 Drawing Sheets

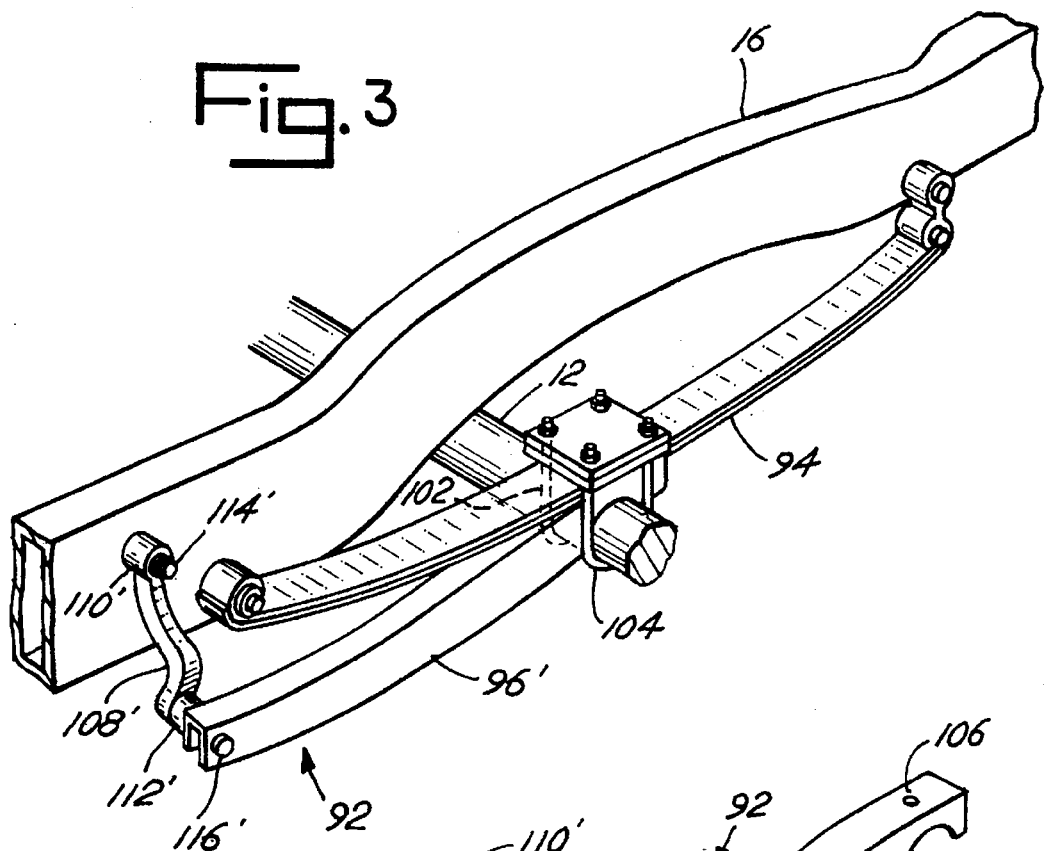
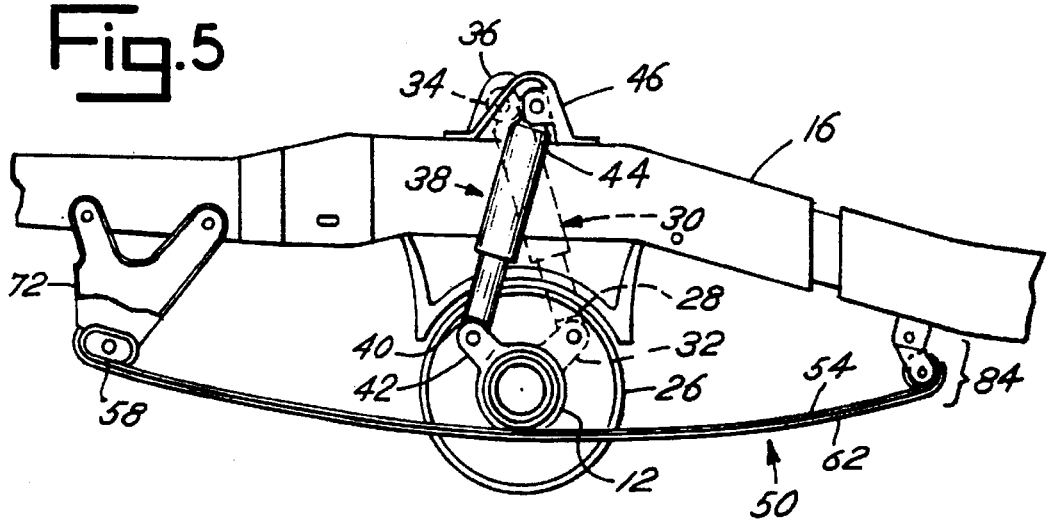

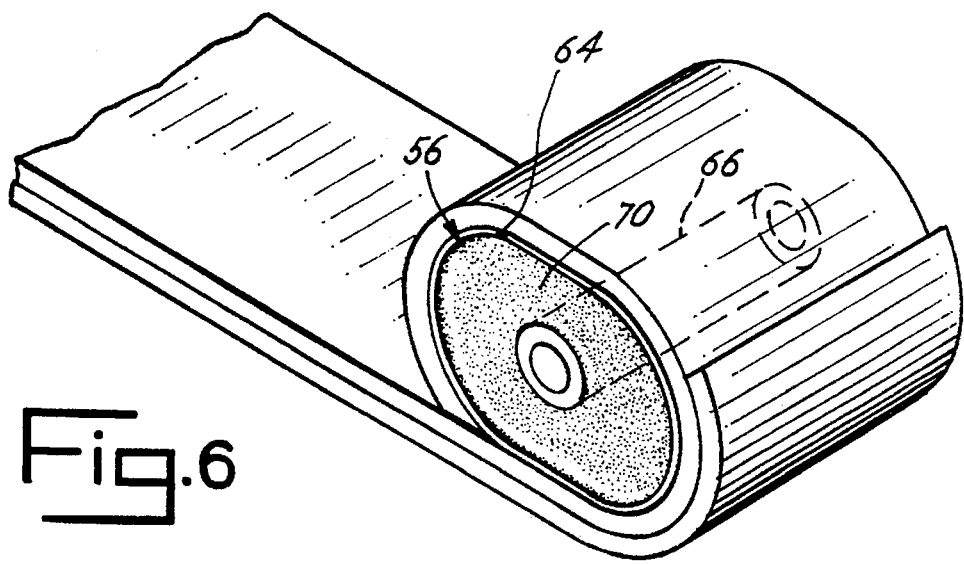
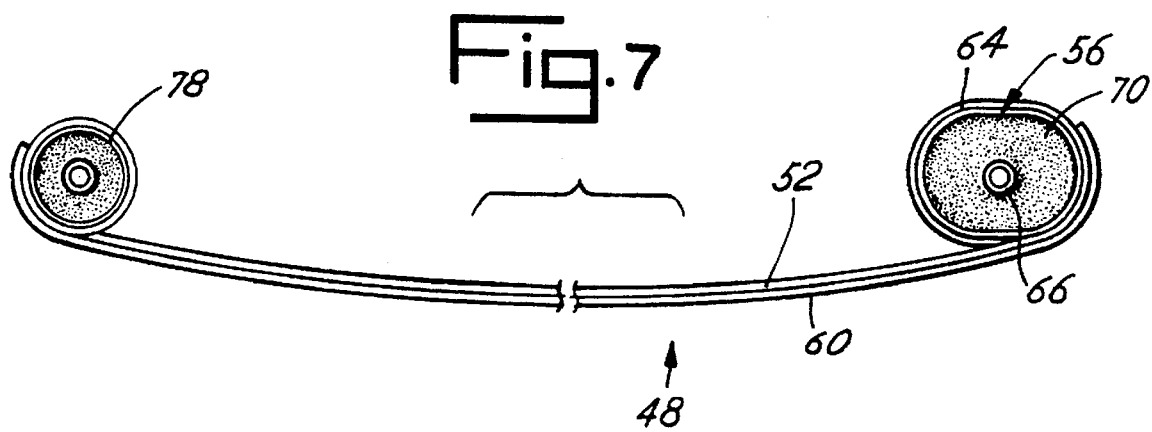

VEHICLE SOLID AXLE FRONT SUSPENSION SYSTEM

BACKGROUND OF THE INVENTION

The present invention relates to vehicle suspension systems and, more particularly, to solid axle front suspension systems. While solid axle front suspension systems are known generally in the art, the solid axle front suspension system of the present invention is directed at improving the known prior art systems in a variety of respects.

It is desirous, for example, to have a leaf spring front suspension system which does not frequently encounter leaf spring windup. Front axle leaf spring windup can contribute to start-up shudder with a driven front axle, shudder during vehicle braking, and front tire toe angle change during vehicle braking. Moreover, earlier front axle leaf spring assemblies can transfer harsh longitudinal loads to a region of the suspension system beneath the driver's foot location, which in turn may influence driver perceived vehicle suspension noise, vibration and harshness levels.

It is also desirous to have a solid front axle suspension system wherein the shock absorber arrangement provides the desired amount of damping in vehicle roll and axle pitch conditions. Further, it is also advantageous to avoid shock absorber arrangements having low shock absorber lever ratios, because low lever ratios can impose restrictions on how the shock absorbers can be tuned. Moreover, it is desirous to balance the shock absorber lever ratios from the left side of the vehicle to the right side of the vehicle to improve vehicle performance on undulating roads.

An improved solid front axle suspension system might also include a steering linkage assembly which does not result in front tire toe steer during vehicle braking or create an on-center steering deadband, as can be found in certain earlier suspension designs. In addition, certain earlier steering linkage assemblies do not completely balance the percent Ackerman realized between a full left steering wheel angle and a full right steering wheel angle. Moreover, the amount in which the steering linkage ratio may vary is often limited in earlier designs by the amount of clearance provided to the front of the front axle.

Finally, it is also desirous to have a suspension system which simultaneously provides a significant reduction in the front tire toe angle change during vehicle braking, a considerable improvement toe change in the ride mode of the front wheels, adequate roll understeer during vehicle cornering, and an appreciable reduction in the amount of lateral forces transmitted into the vehicle body.

It is therefore an object of the present invention to provide a vehicle front suspension system that provides the driver with basic steering and vehicle handling improvements.

It is also an object of the present invention to provide a vehicle suspension system that improves vehicle braking performance and perceived braking feel.

It is also an object of the present invention to provide a vehicle front suspension system that transfers longitudinal loads to a forward region on the vehicle frame.

It is also an object of the present invention to provide a vehicle front suspension system that helps facilitate passenger ingress into and egress from the vehicle.

It is also an object of the present invention to provide a vehicle front suspension system which improves suspension noise, vibration and harshness levels.

It is also an object of the present invention to provide a vehicle suspension system which reduces leaf spring windup.

It is also an object of the present invention to provide a vehicle suspension system which reduces loads in the vehicle body, frame, and suspension under vehicle braking, vehicle acceleration, and rough road driving conditions.

It is also an object of the present invention to provide a vehicle suspension system which helps to maintain the appropriate position of driven axles and driveshafts to ensure proper driveline angles.

It is also an object of the present invention to provide a vehicle front suspension system which reduces front tire toe angle change during vehicle braking.

It is also an object of the present invention to provide a vehicle suspension system which reduces start-up shudder during vehicle acceleration.

It is also an object of the present invention to provide a vehicle suspension system which provides adequate damping in vehicle roll conditions.

It is also an object of the present invention to provide a vehicle suspension system which provides adequate damping in axle pitch conditions.

It is also an object of the present invention to provide a vehicle front suspension system that increases shock absorber lever ratio.

It is also an object of the present invention to provide a vehicle front suspension system that balances the shock absorber lever ratio from the left side of the vehicle to the fight side of the vehicle.

It is also an object of the present invention to provide a vehicle front suspension system that allows the steering linkage ratio to vary independent from the amount of clearance space provided in front of the front axle.

It is also an object of the present invention to provide a vehicle front suspension system that balances the ackerman of the front tires from the left side of the vehicle to the fight side of the vehicle.

It is also an object of the present invention to provide a vehicle suspension system which reduces ridesteer and provides optimum toe change in the ride mode of the front wheels.

It is also an object of the present invention to provide a vehicle suspension system which provides optimum roll understeer during vehicle cornering.

SUMMARY OF THE INVENTION

These and other important objects are met by the solid axle front suspension system of the present invention. Disclosed is a front suspension system which includes a solid axle that is disposed beneath a forward end of a vehicle frame. The axle has a first end and a second end, each of the two ends having a forward side and a rearward side. A bottom end of a first shock absorber connects to the first end of the axle at the rearward side of the first axle end. A top end of the first shock absorber connects to a point on the vehicle frame forward of the bottom end of the first shock absorber. In this way the first shock absorber is pitched forward at a select vertical pitch angle when fully mounted as a part of the vehicle suspension system.

A second shock absorber connects at its bottom end to the forward side of the second end of the axle. A top end of the second shock absorber connects to a point on the vehicle frame rearward of the bottom end of the second shock absorber such that the second shock absorber, when fully mounted, is pitched rearward at a similar vertical pitch angle as lies the first shock absorber. This staggered shock absorber arrangement provides adequate damping in both vehicle roll and axle pitch conditions. The arrangement also increases shock absorber lever ratios and balances the lever ratios from the left side of the vehicle to the right side of the vehicle.

A leaf spring assembly is also disclosed which improves vehicle suspension noise, vibration and harshness levels. The assembly includes a main leaf plate having an elliptical eye formed at a forward end of the main leaf plate. An elliptical bushing is adapted to be received and retained within the elliptical eye on the forward end of the main leaf plate. A shackle eye is formed at a rearward end of the main leaf plate.

A leaf spring front axle suspension system anti-windup device is also disclosed. The anti-windup device, which reduces leaf spring windup, includes a windup bar which is adapted at a first end to be received and secured between the vehicle axle and the leaf spring. A moveable link connects a second end of the windup bar to the vehicle frame. The moveable link preferably comprises a rod that is adapted to be pivotally connected at one end to the windup bar, and adapted to be pivotally connected at the other end to the vehicle frame.

Also disclosed is a bilateral link steering linkage assembly which provides the driver of the vehicle which basic steering and handling improvements. The linkage assembly includes a tie rod that is connected at one end to a tie rod arm on a first front steering knuckle and connected at another end to a tie rod arm on a second front steering knuckle. The first steering knuckle lies adjacent a first side of the vehicle frame while the second steering knuckle lies adjacent a second side of the vehicle frame. A drag link connects at one end to a pitman arm and connects at the other end to a drag link arm on the first steering knuckle. When in place, the drag link extends between the pitman arm and the first steering knuckle in a substantially horizontal plane that is substantially parallel to a horizontal plane in which the front axle lies. This linkage assembly reduces front tire toe angle change during vehicle braking, and balances the Ackerman of the front tires from the left side of the vehicle to the right side of the vehicle. The assembly also permits the vehicle steering linkage ratio to vary independent of the amount of clearance space provided in front of the front axle.

The drag link and panard rod configuration of the present invention simultaneously provides for any desirable level of roll understeer during vehicle cornering, reduces ridesteer and provides optimum toe change in the ride mode of the front wheels, and reduces the front tire toe angle change during braking. The drag link extends between the pitman arm and the first steering knuckle at a rearward sweep angle. The panard rod, which has a length that is substantially equal to the length of said drag link, connects at a first end to the second side of the vehicle frame. A second end of the panard rod connects to the solid axle at the axle end that lies adjacent the first side of the vehicle frame. The panard rod extends between the second side of the vehicle frame connection and the axle connection at a rearward sweep angle that is substantially the same as the rearward sweep angle of the drag link.

BRIEF DESCRIPTION OF THE DRAWING

A preferred embodiment of the present invention is described herein with reference to the drawing wherein:

FIG. 3 is a front left perspective view of a portion of an overslung leaf spring solid axle front suspension system incorporating a second embodiment of the leaf spring anti-windup device of the present invention;

FIG. 4 is a front left perspective view of the leaf spring antiwindup device illustrated in FIG. 3;

FIG. 5 is a left side view of the staggered shock absorber portion of the solid axle front suspension system shown in FIG. 1;

FIG. 6 is a right perspective view of a forward portion of the right-hand side leaf spring shown in FIG. 1;

FIG. 7 is a right side view of the right-hand side leaf spring shown in FIG. 1;

DESCRIPTION OF THE PREFERRED EMBODIMENT

Figure 8:
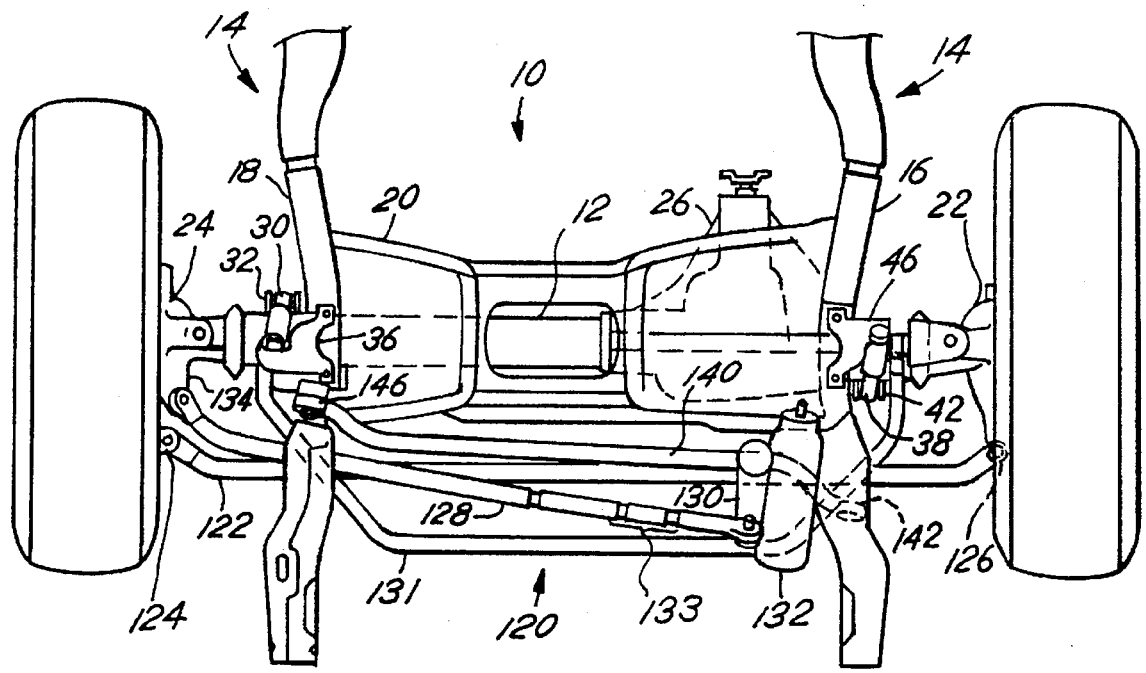
FIG. 8 is a top view of the solid axle front suspension system illustrated in FIG. 1.
Figure 9:
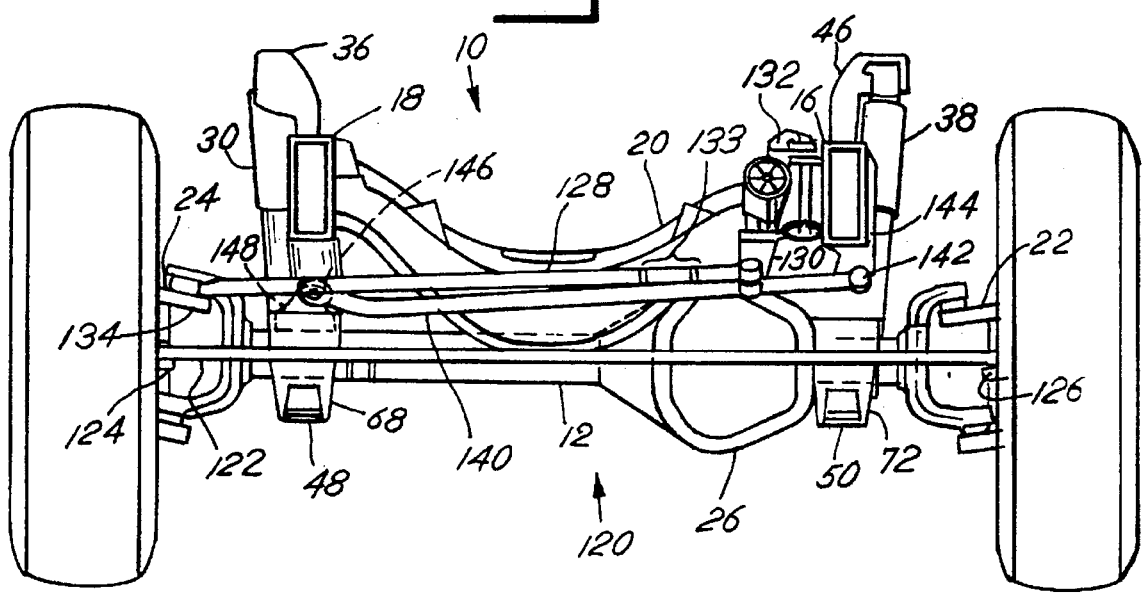
FIG. 9 is a front view of the solid axle front suspension system illustrated in FIG. 1 and 8.

There is shown in the figures a solid axle front suspension system for a vehicle 10. Referring first to FIGS. 1, 5, 8 and 9, the inventive suspension system illustrated therein includes a solid axle 12 that is disposed beneath a forward end of a vehicle frame 14. The vehicle frame 14 shown in the figures has a support member 16 on the left side of the frame 14, a support member 18 on the right side of the frame 14, and a cross member 20 connecting the two side support members 16 and 18. The axle 12 has a left end and a right end. As is best shown in FIGS. 8 and 9, a left steering knuckle 22 is attached to the left end of the axle 14 while a right steering knuckle 24 is attached to the right end of the axle 12. Each end of the axle 12 has a forward side and a rearward side, the forward side being the front half of the axle 12 as the axle 12 lies in the assembled suspension system, and the rearward side being the rear half of the axle 12. A front axle differential 26 lies intermediate the left and right ends of the front axle 12 shown in the figures.

In the preferred embodiment, a bottom end 28 of a first shock absorber 30 pivotally connects in a conventional manner through bracket 32 to the axle 12 at the rearward side of the right end of the axle 12. A top end 34 of the first shock absorber 30 pivotally connects in a conventional manner at the bracket 36 to a point on the vehicle frame 14 forward of the bottom end 28 such that the first shock absorber 30 is pitched forward at a select vertical pitch angle when mounted as a part of the vehicle suspension system.

A second shock absorber 38 on the other side of the vehicle frame 14 is attached in a conventional manner at its bottom end 40 through the bracket 42 to the forward side of the left end of axle 12. A top end 44 of the second shock absorber 38 connects in a conventional manner at bracket 46 to a point on the vehicle frame 14 rearward of the bottom end 40 such that the second shock absorber 38 is pitched rearward at a select vertical pitch angle. The first and second shock absorbers 30 and 38 are preferably placed as far outboard on the axle as possible to optimize the shock absorber lever ratio for vehicle roll conditions.

When mounted as a part of the vehicle suspension system, the first and second shock absorbers 30 and 38 are pitched in opposite directions to create a staggered shock absorber arrangement, as is best shown for example in FIG. 5. This configuration helps ensure that at least one of the two shock absorbers is working in rebound under axle pitch conditions. The appropriate vertical pitch angle for the first and second shock absorber is determined by computer simulation such that the lever ratios of the left and right shock absorbers 30 and 38 are balanced. Balancing the left and right shock absorber lever ratios keeps damping forces the same during driving on undulating roads, and therefore decouples the ride and roll modes. The pitched arrangement of the first and second shock absorbers 30 and 38 also helps increase shock absorber lever ratios, which helps in the design and tuning of shock absorber internal valving assemblies by reducing valve aperture size.

Figure 1:
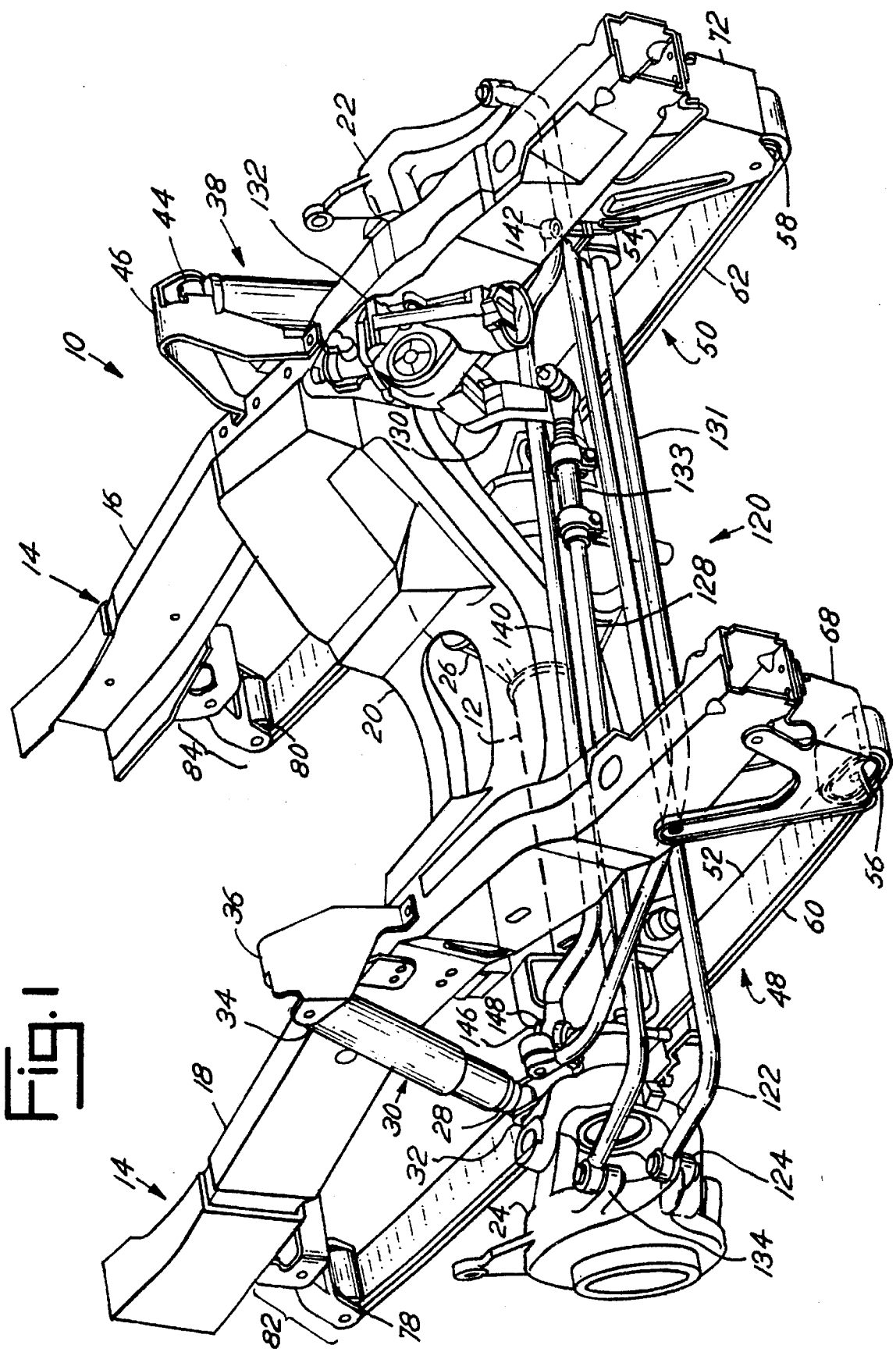
FIG. 1 is a front right perspective view of a solid axle front suspension system illustrating the salient features of the present invention.

Referring now to FIGS. 1 and 5, the preferred suspension system includes front underslung leaf springs 48 and 50. These two front leaf springs 48 and 50 includes main leaf plates 52 and 54, each having an elliptical eye formed at a forward end of the main leaf plate. Elliptical bushings 56 and 58 are adapted to be received and retained within the elliptical eyes on the forward ends of the main leaf plates 52 an 54 when the leaf springs are mounted to the vehicle frame 14 as a part of the suspension system. The leaf spring assemblies may include one or more tapered leaf plates 60 and 62 secured below the main leaf plates 52 and 54.

Referring now to the right-hand side leaf spring assembly 48 shown in FIGS. 6 and 7, for example, the elliptical bushing preferably has a large outer metal can 64 that has an elliptical or otherwise oblong shape. An inner metal sleeve 66 disposed along the central axis of the outer can 64 is designed to receive a retaining bolt to secure the forward end of the leaf spring 48 to the vehicle frame through bracket 68. Rubber 70 having a desired stiffness fills the space between the inner sleeve 66 and outer can 64. This elliptical bushing arrangement at the forward end of the leaf spring 48 thereby provides a suspension system that remains stiff in the vertical rate, but which is relatively soft in the longitudinal direction to improve suspension noise, vibration and harshness levels. The left-hand side leaf spring assembly 50 is preferably identical to leaf spring assembly 48 in this regard, and connects to the vehicle frame 14 through bracket 72.

Shackle eyes are formed at the rearward ends of the main leaf plates 52 and 54 to retain conventional circular-shaped bushings 78 and 80. The rearward ends of the leaf springs 48 and 50 are mounted to the shackle assemblies 82 and 84, which in turn mount to the vehicle frame 14. The forward position of the secured elliptical bushings 56 and 58 on the vehicle frame, relative to the shackle assemblies 82 and 84, transfers longitudinal loads to a forward region on the vehicle frame 14 rather than below the front passenger foot location.

Figure 2:
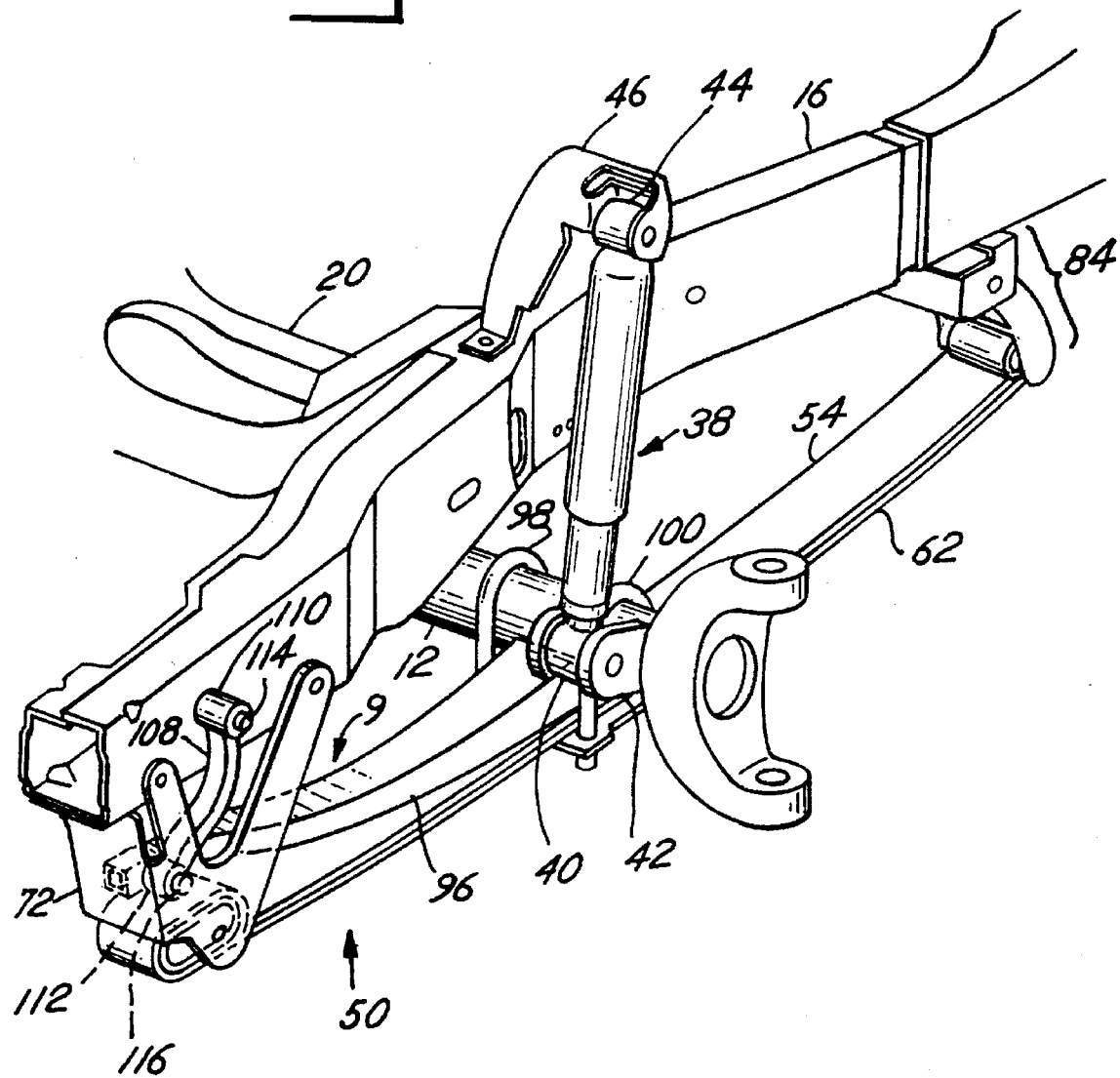
FIG. 2 is a front left perspective view of a portion of an underslung leaf spring solid axle front suspension system incorporating a first embodiment of the leaf spring anti-windup device of the present invention.

An anti-windup device that is designed to reduce leaf spring windup is shown in FIGS. 2–4. In particular, FIG. 2 illustrates one example embodiment of the device 90 as used in connection with the underslung leaf spring assembly shown in FIG. 1. FIG. 3, on the other hand, illustrates a second example embodiment of the device 92 as used in connection with an overslung leaf spring assembly 94, an assembly for which the anti-windup device is especially suited.

The anti-windup device comprises a windup bar 96 or 96' which is adapted at a first end to be received and secured between the leaf spring and the vehicle axle 12. The preferred windup bar 96 and 96' is stiff and is constructed from a heavy duty steel. The first end of the windup bar 96 and 96' is preferably shaped to fit snugly over a perch that is welded to the axle 12, where the windup bar 96 and 96' is bolted to the axle 12 and further secured in position by the clamp load provided by the leaf spring U-bolts 98 and 100, or 102 and 104. An aperture 106 at the first end of the windup bar 96 and 96' permits passage of the leaf spring center bolt, which helps secure the leaf spring and anti-windup device 90 or 92 in position relative to the axle 12.

A moveable link 108 and 108' connects a second end of the windup bar 96 and 96' to the vehicle frame. The moveable link 108 and 108' preferably comprises a stiff steel rod that is adapted to be pivotally connected at one end to the windup bar 96 and 96', and adapted to be pivotally connected at the other end to the vehicle frame 14. The pivot joints 110, 110', 112, and 112' shown in the figures are standard silent block type rubber bushings which are secured by bolts 114, 114', 116, and 116'.

The moveable link and windup bar arrangement is designed to inhibit any torquing of the windup bar, and thereby the leaf springs and axle, during vehicle acceleration and braking, but not to interfere with acceptable vertical deflections of the suspension system. While the anti-windup device of the present invention is suitable for use on either side of the vehicle suspension system, only one side of the suspension should incorporate the anti-windup device to avoid unwanted binding up of the axle under axle roll conditions. Moreover, the windup bar preferably extends away from the axle towards the forward end of the vehicle to a point which is chosen by computer simulation of a flexible spring model to be the point that is the center of axle rotation in a side view. The selection of such coordinates will prevent binding of the device during normal ride motions. The link to the frame is permitted to pivot to reduce axle steer during acceleration and braking.

Referring now to FIGS. 1, 8 and 9, the suspension system includes a bi-lateral steering linkage assembly 120. In the preferred embodiment, a tie rod 122 pivotally connects at one end to a lower steer arm 124 on the right front steering knuckle 24 and at a second end to a lower steer arm 126 on the left front steering knuckle 22. The left and right front steering knuckles 22 and 24 are operatively connected in a conventional manner to the two respective ends of the front axle 12. The right steering knuckle 24 lies adjacent the right side of the vehicle frame 14 while the second steering knuckle 22 lies adjacent the left side of the vehicle frame 14. A drag link 128 pivotally connects at one end to a pitman arm 130. The pitman arm 130 is, in turn, pivotally connected to the steering gear 132. The other end of the drag link 128 pivotally connects to an upper steering arm 134 on the right steering knuckle 24. As is best shown in FIG. 8, the drag link 128 extends between the pitman arm 130 and the right steering knuckle 24 in a substantially horizontal plane that is substantially parallel to a horizontal plane in which the from axle 12 lies. An optional stabilizer bar 131 is also shown in the figures. Moreover, sleeves similar to sleeve 133 may be used to permit adjustment of the various linkage components.

The bilateral linkage assembly 120 reduces the front tire toe angle change during vehicle braking, and balances the percent Ackerman of the front tires from the left side of the vehicle to the right side of the vehicle. In particular, the separate steering arms 124 and 134 on the right steering knuckle 24 for the drag link and the tie rod connections provides the ability to independently tone steering linkage ratio and percent Ackerman from one side of the vehicle to the other side. By moving this point forward relative to the wheel center slows down the steering linkage ratio, while moving the point side to side changes the percent Ackerman in left and right turn directions.

The bilateral linkage assembly 120 also reduces the on-center steering deadband inherent in earlier steering linkage designs, and in particular those designs where the drag link connects to the right side of a tie rod which, in turn, connects the two steer arms of the front steering knuckles, or where the drag link connects to a steer arm on the right steering knuckle and a tie rod connects the right side of the drag link to a steering arm on the left steering knuckle.

Moreover, the substantially horizontal nature of the drag link 128 spaced above the front axle 12 permits the vehicle steering linkage ratio to vary independent from the amount of clearance space provided in front of the front axle 12. Since the drag link 128 does not pass immediately forward of the from axle 12, as the drag link does in more conventional steering assemblies, the range of drag link rearward sweep angles necessary to vary the steering linkage ratio is not limited by any direct presence of the front axle 12 behind the drag link 128. This also provides the designer with more flexibility in the placement of the steering gear.

As indicated above, the drag link 128 extends between the pitman arm 130 and the right front steering knuckle 24 at a rearward sweep angle that can be viewed and measured in a horizontal plane, as can best be seen for example in FIG. 7. A panard rod 140 pivotally connects in a conventional manner at a first end to the left side of the vehicle frame 14 through the joint 142 and the bracket 144. A second end of the panard rod 140 pivotally connects in a conventional manner to the fight end of the axle 12 adjacent to the fight side of the vehicle frame 14 through the joint 146 and bracket 148. The two connection points of the panard rod 140 are selected so as to minimize ride steer and the binding forces imposed on the brackets 144 and 148 by the panard rod 140 in the ride mode.

The panard rod 140 preferably has a length that is substantially equal to the length of the drag link 128. The panard rod 140 also extends across the vehicle frame 14 at a rearward sweep angle that can be again viewed and measured in a horizontal plane. The rearward sweep angle of the panard rod 140 preferably is substantially the same as the rearward sweep angle of the drag link 128. The drag link and panard rod configuration of the present invention simultaneously provides for optimum roll understeer during vehicle cornering, minimum toe change in the ride mode of the front wheels, and a reduction of the front tire toe angle change during braking.

Although certain embodiments of the invention have been described and illustrated herein, it will be readily apparent to those of ordinary skill in the art that a number of modifications and substitutions can be made to the solid axle front suspension system disclosed and described herein without departing from the true spirit and scope of the invention.

We claim:

1. A solid front axle suspension system for a vehicle, comprising:

a vehicle frame having a forward end, a rearward end, a first side and a second side;

a solid front axle laterally disposed beneath said vehicle frame, said axle having a first end and a second end;

a first shock absorber connected to said first end of said axle and said vehicle frame, said first shock absorber being pitched forward and disposed substantially directly over said axle; and a second shock absorber connected to said second end of said axle and said vehicle frame, said second shock absorber being pitched rearward and disposed substantially directly over said axle.

2. A solid front axle suspension system for a vehicle, comprising:

a vehicle frame having a forward end, a rearward end, a first side and a second side;

a solid front axle laterally disposed beneath said vehicle frame, said axle having a first end and a second end, each of said ends of said solid axle having a forward side and a rearward side;

a first shock absorber having a top end and a bottom end, said first shock absorber connected at said bottom end to said rearward side of said first end of said solid axle and connected at said top end to a point on said vehicle frame forward of said bottom end of said first shock absorber whereby said first shock absorber is pitched forward at a select vertical pitch angle; and a second shock absorber having a top end and a bottom end, said second shock absorber connected at said bottom end to said forward side of said second end of said solid axle and connected at said top end to a point on said vehicle frame rearward of said bottom end of said second shock absorber whereby said second shock absorber is pitched rearward at substantially said select vertical pitch angle.

3. A solid front axle suspension system for a vehicle as set forth in claim 2, further comprising:

a first steering knuckle connected at said first end of said solid front axle;

a second steering knuckle connected at said second end of said solid front axle; and a drag link having a first end and a second end, said first end being connected to a pitman arm and said second end being connected to said first steering knuckle whereby said drag link extends between said pitman arm and said first steering knuckle at a rearward sweep angle.

4. A solid front axle suspension system for a vehicle as set forth in claim 3, further comprising a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

5. A solid front axle suspension system for a vehicle as set forth in claim 2, further comprising a first leaf spring assembly disposed on said first end of said axle and a second leaf spring assembly disposed on said second end of said axle, each of said leaf spring assemblies having a main leaf plate having an elliptical eye formed at a forward end of said main leaf plate and a shackle eye formed at a rearward end of said main leaf plate whereby an elliptical bushing can be received and retained within said elliptical eye.

6. A solid front axle suspension system for a vehicle as set forth in claim 5, including an anti-windup device comprising a windup bar having a first end and a second end, said first end being adapted to be received and secured between said axle and one of said two leaf spring assemblies, and a moveable link connected between said second end of said windup bar and said vehicle frame.

7. A solid front axle suspension system for a vehicle as set forth in claim 6, wherein said moveable link comprises a rod having a first end and a second end, said first end of said rod being adapted for pivotal connection to said second end of said windup bar, and said second end being adapted for pivotal connection to said vehicle frame.

8. A solid front axle suspension system for a vehicle as set forth in claim 1, further comprising:

a first steering knuckle connected at said first end of said solid front axle;

a second steering knuckle connected at said second end of said solid front axle a tie rod having a first end and a second end, said first end being connected to said first steering knuckle and said second end being connected to said second steering knuckle; and a drag link having a first end and a second end, said first end being connected to a pitman arm and said second end being connected to said first steering knuckle whereby said drag link extends between said pitman arm and said first steering knuckle in a substantially horizontal plane that is substantially parallel to a horizontal plane in which a front axle of said vehicle lies.

9. A solid front axle suspension system for a vehicle as set forth in claim 1, whereby said first shock absorber is pitched forward at a select vertical pitch angle, and whereby said second shock absorber is pitched rearward at substantially said select vertical pitch angle.

10. A solid front axle suspension system for a vehicle as set forth in claim 1, further comprising:

a leaf spring assembly disposed on one of said ends of said axle; and an anti-windup device comprising a windup bar having a first end and a second end, said first end being adapted to be received and secured between said axle and said leaf spring assembly, and a moveable link connected between said second end of said windup bar and said vehicle frame.

11. A solid front axle suspension system for a vehicle as set forth in claim 10, wherein said leaf spring assembly has a main leaf plate having an elliptical eye formed at a forward end of said main leaf plate and a shackle eye formed at a rearward end of said main leaf plate whereby an elliptical bushing can be received and retained within said elliptical eye.

12. A solid front axle suspension system for a vehicle as set forth in claim 11, further comprising:

a first steering knuckle connected at said first end of said axle;

a second steering knuckle connected at said second end of said axle; and a drag link having a first end and a second end, said first end being connected to a pitman arm and said second end being connected to said first steering knuckle whereby said drag link extends between said pitman arm and said first steering knuckle in a substantially horizontal plane that is substantially parallel to a horizontal plane in which a front axle of said vehicle lies.

13. A solid front axle suspension system for a vehicle as set forth in claim 12, whereby said drag link also extends between said pitman arm and said first steering knuckle at a rearward sweep angle, and further comprising a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

14. A solid front axle suspension system for a vehicle as set forth in claim 10, further comprising:

a first steering knuckle connected at said first end of said axle;

a second steering knuckle connected at said second end of said axle; and a drag link having a first end and a second end, said first end being connected to a pitman arm and said second end being connected to said first steering knuckle whereby said drag link extends between said pitman arm and said first steering knuckle in a substantially horizontal plane that is substantially parallel to a horizontal plane in which a front axle of said vehicle lies.

15. A solid front axle suspension system for a vehicle as set forth in claim 14, whereby said drag link also extends between said pitman arm and said first steering knuckle at a rearward sweep angle, and further comprising a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

16. A solid front axle suspension system for a vehicle as set forth in claim 1, further comprising at least one leaf spring assembly disposed on an end of said axle, said leaf spring assembly having a main leaf plate having an elliptical eye formed at a forward end of said main leaf plate and a shackle eye formed at a rearward end of said main leaf plate whereby an elliptical bushing can be received and retained within said elliptical eye.

17. A solid front axle suspension system for a vehicle as set forth in claim 16, further comprising:

a first steering knuckle connected at said first end of said axle;

a second steering knuckle connected at said second end of said axle; and a drag link having a first end and a second end, said first end being connected to a pitman arm and said second end being connected to said first steering knuckle whereby said drag link extends between said pitman arm and said first steering knuckle in a substantially horizontal plane that is substantially parallel to a horizontal plane in which a front axle of said vehicle lies.

18. A solid front axle suspension system for a vehicle as set forth in claim 17, whereby said drag link also extends between said pitman arm and said first steering knuckle at a rearward sweep angle, and further comprising a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

19. A solid front axle suspension system for a vehicle as set forth in claim 8, whereby said drag link also extends between said pitman arm and said first steering knuckle at a rearward sweep angle, and further comprising a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

20. A solid front axle suspension system for a vehicle as set forth in claim 16, whereby said elliptical bushing comprises an oblong outer can, a cylindrical inner sleeve disposed along a central axis of said outer can, and a rubber material between said inner sleeve and said outer can.

21. A solid front axle suspension system for a vehicle, comprising:

a vehicle frame having a forward end, a rearward end, a first side and a second side;

a solid front axle laterally disposed beneath said vehicle frame, said axle having a first end and a second end, each of said ends of said solid axle having a forward side and a rearward side;

a first shock absorber having a top end and a bottom end, said first shock absorber connected at said bottom end to said rearward side of said first end of said solid axle and connected at said top end to a point on said vehicle frame forward of said bottom end of said first shock absorber whereby said first shock absorber is pitched forward at a select vertical pitch angle;

a second shock absorber having a top end and a bottom end, said second shock absorber connected at said bottom end to said forward side of said second end of said solid axle and connected at said top end to a point on said vehicle frame rearward of said bottom end of said second shock absorber whereby said second shock absorber is pitched rearward at substantially said select vertical pitch angle;

a first leaf spring assembly disposed on said first end of said axle and a second leaf spring assembly disposed on said second end of said axle, each of said leaf spring assemblies having a main leaf plate having an elliptical eye formed at a forward end of said main leaf plate and a shackle eye formed at a rearward end of said main leaf plate whereby an elliptical bushing can be received and retained within said elliptical eye;

a windup bar having a first end and a second end, said first end being adapted to be received and secured between said axle and one of said two leaf spring assemblies;

a moveable link connected between said second end of said windup bar and said vehicle frame, said moveable link comprising a rod having a first end and a second end, said first end of said rod being adapted for pivotal connection to said second end of said windup bar, and said second end being adapted for pivotal connection to said vehicle frame;

a first steering knuckle connected at said first end of said axle;

a second steering knuckle connected at said second end of said axle;

a drag link having a first end and a second end, said first end being connected to a pitman arm and said second end being connected to said first steering knuckle whereby said drag link extends between said pitman arm and said first steering knuckle at a rearward sweep angle in a substantially horizontal plane that is substantially parallel to a horizontal plane in which a front axle of said vehicle lies; and a panard rod having a first end, a second end, and a panard rod length that is substantially equal to a length of said drag link, said first end of said panard rod being connected to said second side of said vehicle frame and said second end of said panard rod being connected to said first end of said solid axle whereby said panard rod extends between said second side of said vehicle frame and said first end of said solid axle at substantially said rearward sweep angle.

* * * * *